United States Patent [19]

Miller

[11] Patent Number: 5,537,682
[45] Date of Patent: *Jul. 16, 1996

[54] RADIO FREQUENCY COMMUNICATIONS SYSTEM

[75] Inventor: Craig Miller, Paoli, Pa.

[73] Assignee: InterDigital Technology Corporation, Wilmington, Del.

[21] Appl. No.: 398,440

[22] Filed: Mar. 3, 1995

[*] Notice: The term of this patent shall not extend beyond the expiration date of Pat. No. 5,212,830.

Related U.S. Application Data

[63] Continuation of Ser. No. 63,935, May 17, 1993, Pat. No. 5,396,646, which is a continuation of Ser. No. 708,694, May 31, 1991, Pat. No. 5,212,830.

[51] Int. Cl.[6] .............................. H04B 7/26; H04Q 7/36
[52] U.S. Cl. .................... 455/33.1; 455/33.3; 455/56.1; 379/59
[58] Field of Search ................ 455/33.1–33.4, 455/34.1, 34.2, 54.1, 54.2, 56.1; 379/59, 60

[56] References Cited

U.S. PATENT DOCUMENTS

| | | | |
|---|---|---|---|
| 4,128,740 | 12/1978 | Graziano | 179/2 |
| 4,144,411 | 3/1979 | Frenkiel | 179/2 |
| 4,759,051 | 7/1988 | Han | 379/59 |
| 5,067,147 | 11/1991 | Lee | 379/60 |
| 5,212,830 | 5/1993 | Miller | 455/33.1 |
| 5,396,646 | 3/1995 | Miller | 455/33.1 |

FOREIGN PATENT DOCUMENTS

| | | |
|---|---|---|
| 429200 | 5/1991 | European Pat. Off. . |
| 2659638 | 5/1978 | Germany . |

OTHER PUBLICATIONS

IEEE International Conference on Communications 1985; S. A. Mohamed and J. W. Ballance; 19 Ghz Digital Point-to-Multi-Point Radio System for Local Distribution; Jun. 1985; pp. 736 and 737.

*Primary Examiner*—Chi H. Pham
*Attorney, Agent, or Firm*—Volpe and Koenig

[57] ABSTRACT

An RF communications system for providing wireless telecommunication service to sixteen contiguous geographic sectors or cells. The system includes an antenna array having a plurality of antenna sites located at the corners of contiguous geographic sectors. The central antenna site has four directional antennas. The four corner towers each have three directional antennas. Each directional antenna illuminates an entire sector. The location of the antenna sites and the allocation of a frequency group for each sector minimizes RF interference.

5 Claims, 4 Drawing Sheets

RADIO FREQUENCY COMMUNICATIONS SYSTEM

This is a continuation of application Ser. No. 08/063,935, filed on May 17, 1993, now U.S. Pat. No. 5,396,646, which is a continuation of application Ser. No. 07/708,694, filed May 31, 1991 now U.S. Pat. No. 5,212,830.

FIELD OF THE INVENTION

The present invention generally pertains to RF communications systems and is particularly directed to a wireless radio frequency (RF) communications system having an array of base stations with fixed antennas.

BACKGROUND OF THE INVENTION

There are a number of communications systems utilizing assigned frequency channels for use in a wireless RF telecommunications systems. These systems include the well known mobile or cellular telephone systems and the wireless RF telephone system between a base station and a number of subscriber units as described in U.S. Pat. No. 4,675,863. Since the number of communications channels set by the Federal Communications Commission is limited, and the demand for these frequencies continues to rise, new methods must be developed to increase the capacity of these limited number of channels. As user density increases, the usable frequencies near their information carrying capacity limit and the occurrences of RF interference increase.

There have been several systems employed to minimize the RF interference between various base stations and their respective portable units. One of these solutions utilizes a corner illuminated cellular array and places a sector antenna at every second corner of a hexagonally-shaped sector or cell. The antennas are situated so that they illuminate the cell inwardly from their respective corners.

Another solution, disclosed in U.S. Pat. No. 4,128,740, issued Dec. 5, 1978, uses a similar hexagonally-shaped cell arrangement with seven antennas at the center of each cell. Each cell uses a group of frequencies, which is different than the group of frequencies used by each surrounding cell. The cells are then arranged in such a manner so is to minimize co-channel and adjacent channel interferences. Both of the aforementioned systems require an excessive number of antenna sites and a large number of antennas.

SUMMARY OF THE INVENTION

An object of this invention is to minimize the number of antenna sites and frequencies required to provide RF communication links for a given number of channels in a given geographic area.

It is a further object to minimize the probability of blocking from other transceiver activity in an RF communication system employing frequency reuse such that the number of frequency groups is minimized and the number of frequencies available for use by a randomly located transceiver is maximized.

It is another object to this invention to arrange antenna sites and operate them so that co-channel interference is minimized.

The present invention accomplishes the foregoing objects by using a super-cell network, comprised of sixteen approximately square-shaped cells with a directional antenna illuminating each cell. The bandwidth of each directional antenna covers a particular frequency group. A cell can reuse the frequency group of another cell since it will be separated by angle and distance from the previous cell.

The present invention utilizes a type of corner illumination with each antenna providing a 90° illumination. Only one directional antenna is needed to illuminate the entire cell. Inside the super-cell there are a plurality of antenna sites. In one embodiment, there are five antenna sites. At the middle of the super-cell is the central or primary antenna tower where four primary directional antennas are located. These four directional antennas are spaced substantially 90° apart dependent on actual terrain. The four remaining antenna sites are located essentially equidistant from the central tower and spaced 90° apart. These corner or secondary antenna towers serve only three cells each.

These objects and additional features of the present invention will be better understood from the detailed description given below in conjunction with the drawings.

DETAILED DESCRIPTION OF THE PREFERRED EMBODIMENT

The present invention is particularly well suited for an RF communication system as disclosed in U.S. Pat. No. 4,675,863, issued Jun. 23, 1987; U.S. Pat. No. 4,825,448, issued Apr. 25, 1989; U.S. Pat. No. 4,777,633, issued Oct. 11, 1988; and U.S. Pat. No. 5,008,900, issued Apr. 16, 1991; these patents being incorporated herein by reference.

Figure 1:
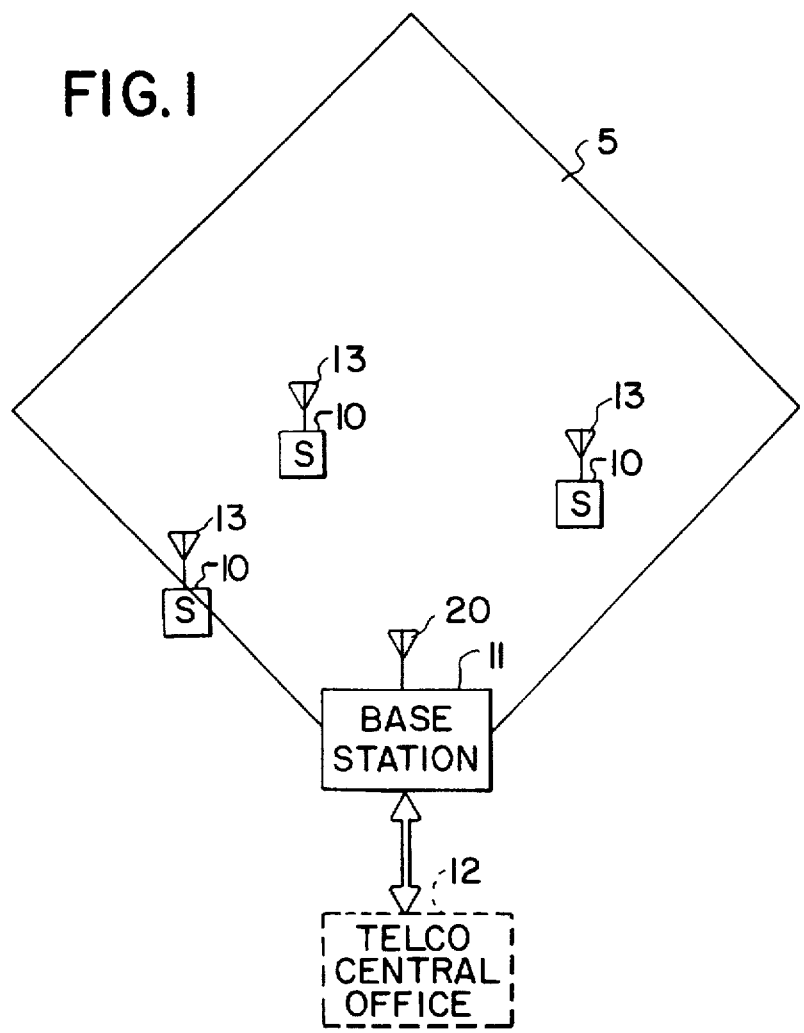
FIG. 1 is a block diagram generally showing the RF subscriber telephone system.

Referring to FIG. 1, a block diagram of a typical subscriber RF communications system is shown. Within each cell 5 are a plurality of subscriber units 10 and a base station 11. Each base station 11 is connected to a telephone company's central office 12 for calls to or from points outside of the system. The base station 11 is also connected to a directional antenna 20. The subscriber units 10 can be fixed or mobile. Each subscriber unit 10 has an accompanying subscriber antenna 13.

In the preferred embodiment, Ultraphone® base station and subscriber units, commercially available from International Mobile Machines Corporation, are used for the telecommunications functions. The directional antenna 20 is a "SCALA" antenna model 2CL-400VV. The subscriber antennas 13 may also be directional for fixed subscriber units but are preferably omnidirectional antennas, e.g. a folded dipole, for mobile subscriber units.

Figure 2:
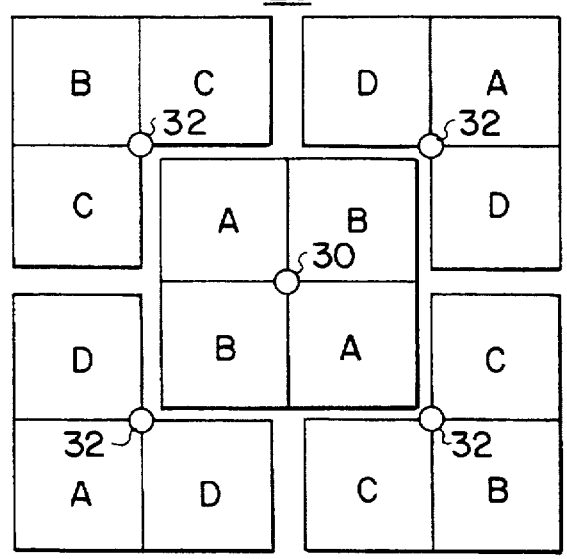
FIG. 2 shows a graphical view of the corner illuminated antenna array system according to the present invention.
Figure 3:
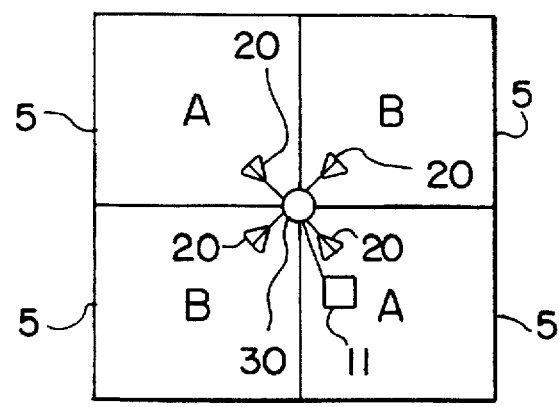
FIG. 3 shows a graphical view of the four center cells in accordance with the present invention.

The network scheme to reuse frequencies is depicted in FIG. 2. In the preferred embodiment, four groups of frequencies are used. These groups are labeled A, B, C, and D. A super-cell, generally denoted by 25, consists of sixteen of the smaller cells 5. The primary or central antenna tower 30 generally coincides with the location of a primary base station 11. The central antenna tower 30 has four primary directional antennas 20 to illuminate four primary geographical sectors or cells. The four primary directional antennas 20 are spaced substantially 90° apart. FIG. 3 better depicts the positioning of the primary antennas with respect to the central tower 30.

Figure 5:
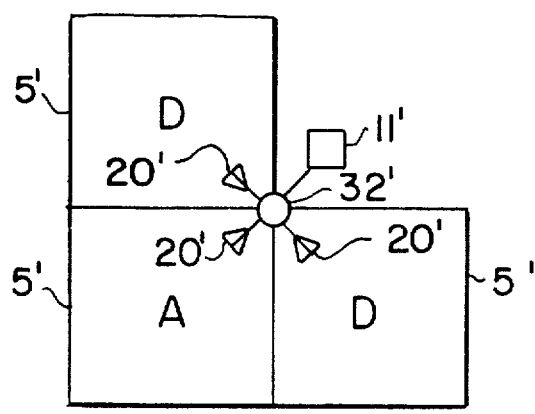
FIG. 5 shows a graphical view of a second secondary sector in accordance with the present invention.
Figure 4:
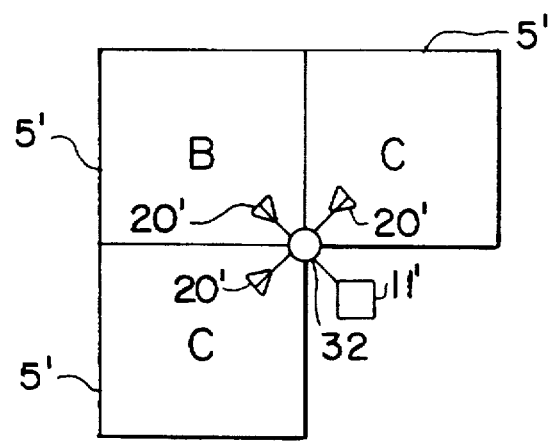
FIG. 4 shows a graphical view of a first secondary sector in accordance with present invention.

The corner or secondary towers 32 are located generally concentrically about or equi-distant from the center tower 30 and are spaced 90° apart. A secondary base station 11 is located near the secondary tower 32. The primary directional antennas 20 of the center tower 30 generally point towards each of the corner towers 32. The four corner towers 32 and 32' have three secondary directional antennas 20' each, as shown in FIGS. 4 and 5, with each antenna illuminating its own individual secondary sector or cell 5'.

A group of frequencies are used in each individual sector or cell. Typically, the group includes pairs of frequencies for duplex transmission which each may be time division multiplexed. In the preferred embodiment, there are four groups of frequencies labelled A, B, C, and D. These groups of frequencies can be reused as shown in FIG. 2, with the letters indicating which cells use the same frequency group.

In the preferred embodiment, two frequency groups are used in the four primary sectors. The identical frequency group in the primary sectors are spaced 180° apart.

Each secondary tower services three secondary geographic sectors. In the first secondary antenna site 32, a third frequency group is used in two of the geographic sectors, as shown in FIG. 4, and are spaced 180° apart. The third sector reuses a frequency group from the primary sector. In the second secondary antenna site 32', as shown in FIG. 5, a fourth frequency group is used in two of the geographic sectors spaced 180° apart. The primary frequency group not used with the first secondary tower 32 is reused with second secondary tower 32'.

Third and fourth secondary sectors are added to the primary sectors to complete the super-cell 25. These two secondary towers are similar to first secondary tower 32 and second secondary tower 32' but are rotated 180° and are diametrically positioned on opposite sides of the primary sectors.

Frequency reuse is possible in the present invention since the worst case carrier-to-interferer (C/I) ratio, using the "SCALA" 2CL-400VV antenna, would be at least 32 dB. The free-space loss from the distance between the antennas would be approximately 6.5 dB with the remainder coming from the angle and the difference in antenna gain.

In the basic set of sixteen cells, each frequency group is used four times. If sixty channels are available, each frequency group consists of fifteen channels. Each channel has two frequencies, one for receiving and one for transmitting. Approximately 440 transceivers or subscriber stations can be serviced by each cell with land line quality. (That is P.01 grade of service and 3.6 CCS or the probability of 1 percent that the user will not get a dial tone with the average customer using 360 seconds per hour.) The total number of transceivers served by the super-cell is 16×440 or 7040 transceivers. This number of transceivers is more than sufficient to cover a town or other local area.

Figure 6:
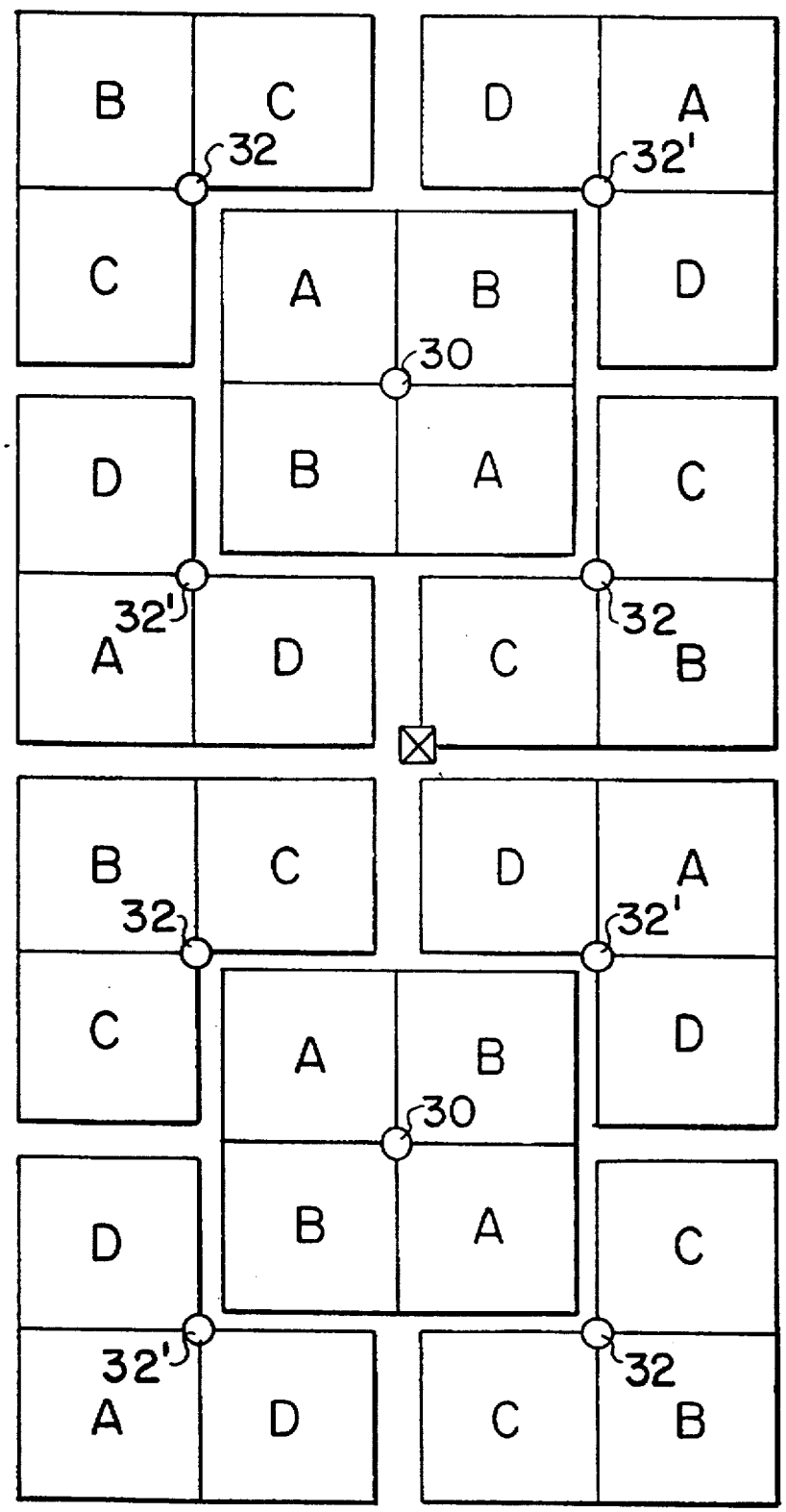
FIG. 6 shows a graphical view of the antenna array replicated to serve a larger number of subscribers.

The super-cell 25 can be replicated to extend the number of subscribers served. The worst case carrier-to-interference ratio now occurs at the spot marked by the X in FIG. 6. If there is a stationary transceiver at this point, a directional antenna can be used. In the preferred embodiment, a "SCALA" model PR-450CU would provide a 25 dB C/I ratio.

Figure 7:
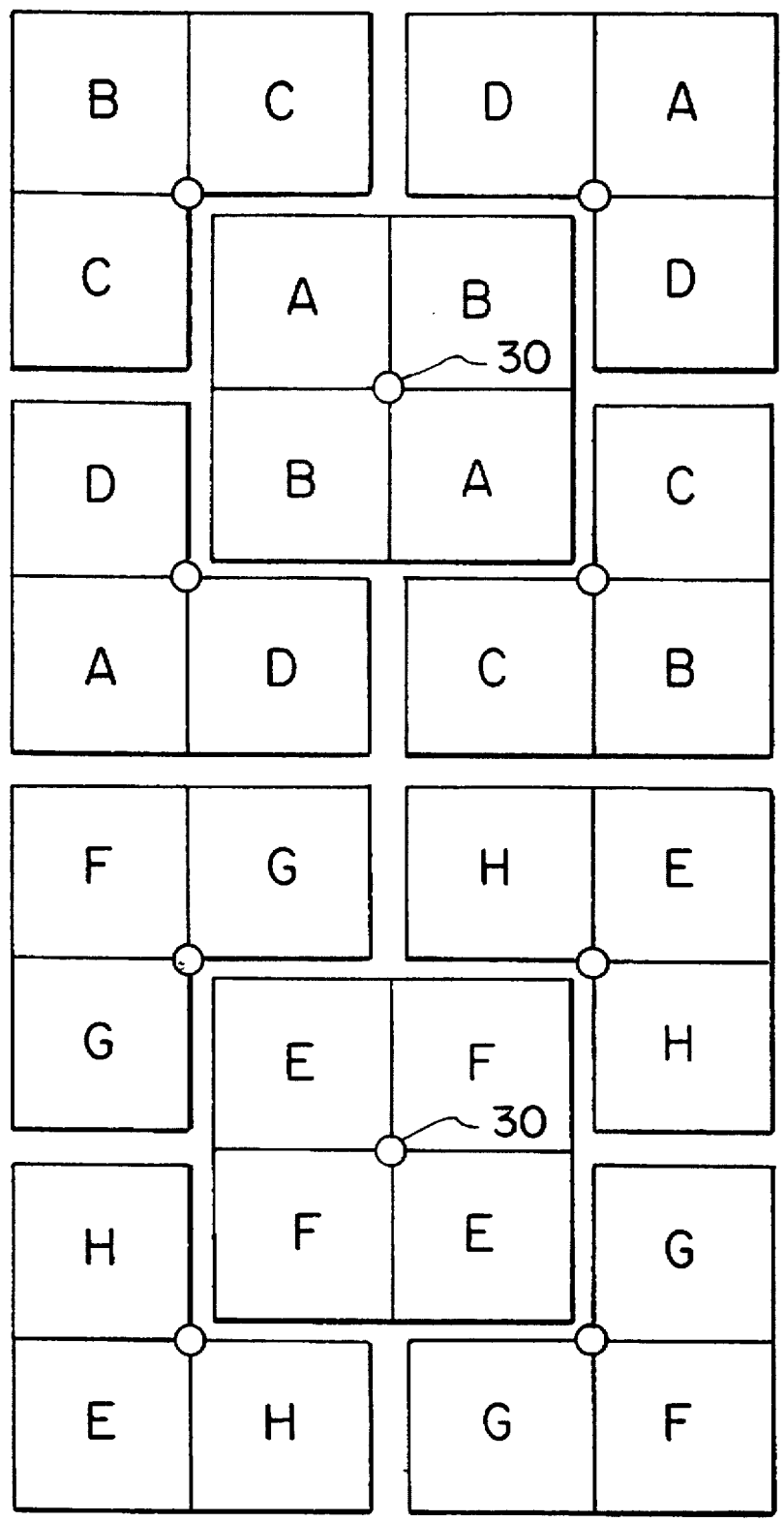
FIG. 7 shows a graphical view of another embodiment of the antenna array to serve a larger number of subscribers.

If the transceivers are not fixed and omnidirectional antennas must be used, another set of four frequency groups, as depicted in FIG. 7, can be utilized. The system in FIG. 7 would maintain a C/I ratio of 32 dB.

This antenna array could be used in higher density areas by increasing the number of channels within each frequency group. Also, more frequency groups could be utilized.

By overlaying the super-cell layout on a transceiver density map, the basic layout can be scaled, rotated and positioned to the best size. This process optimizes the distribution of subscribers to cells. In the case of non-uniform transceiver density, the allocation of the total available channels between the four groups may be unequal.

It will be understood that the invention is not limited to the embodiment disclosed, and is capable of numerous rearrangements, modifications and substitutions without departing from the scope of the invention.

I claim:

1. A communication system for wireless communication between a plurality of base stations and subscriber units within a plurality of contiguous geographic sectors comprising:

a primary base station associated with a plurality of fixed primary directional antennas for transmitting and receiving communication signals, each primary antenna for servicing a separate contiguous primary geographic area;

a first frequency group utilized by said primary base station for wireless communication in a first of said primary geographic areas via a first of said primary antennas;

a second frequency group of frequencies different than the frequencies of said first frequency group utilized by said primary base station in a second of said primary geographic areas;

at least one secondary base station associated with a plurality of fixed secondary directional antennas, each secondary antenna for servicing a separate contiguous secondary geographic area;

said secondary base station antennas located proximate said first primary geographic area opposite the location of said first primary antenna;

said secondary base station antennas being directed away from said first primary geographic area; and said second frequency group being utilized by said secondary base station for wireless communication in a first of said secondary geographic areas.

2. An RF communications system according to claim 1 wherein each frequency group has an equal number of transmit and receive frequency pairs.

3. An RF communications system according to claim 2 wherein said frequency pairs support TDMA communications.

4. An RF communications system according to claim 1 wherein each of said primary and secondary base stations has means for transmitting RF signals, and each said subscriber unit has means for receiving RF signals such that the RF communications system supports at least communication from said primary and secondary base stations to said subscriber units.

5. An RF communications system according to claim 1 wherein each said subscriber unit has means for transmitting RF signals, and each of said primary and secondary base stations has means for receiving RF signals such that the RF communication system supports at least communication from said subscriber units to said primary and secondary base stations.

\* \* \* \* \*